United States Patent
Forrester et al.

[19]

[11] Patent Number: 5,982,755
[45] Date of Patent: Nov. 9, 1999

[54] SYSTEM AND METHOD FOR PROVIDING HIGH TERMINAL COUPLING LOSS IN A HANDSFREE TERMINAL

[75] Inventors: Christopher Michael Forrester, Ottawa; Paul Vincent Coverdale, Nepean, both of Canada

[73] Assignee: Nortel Networks Corporation, Montreal, Canada

[21] Appl. No.: 08/813,031

[22] Filed: Mar. 6, 1997

[51] Int. Cl.[6] .............................. H04B 3/20; H04M 9/08
[52] U.S. Cl. .................. 370/278; 370/286; 370/296; 379/389; 379/409; 379/420
[58] Field of Search ................... 370/286–292, 370/278, 282, 294, 296; 379/406–409, 93.01, 93.05, 93.06, 387, 388, 389, 390, 410, 419, 420, 422

[56] References Cited

U.S. PATENT DOCUMENTS

| | | | |
|---|---|---|---|
| 3,973,086 | 8/1976 | May, Jr. ........................... | 379/406 |
| 4,110,560 | 8/1978 | Leary et al. ..................... | 370/296 |
| 4,165,449 | 8/1979 | Vachon ............................. | 379/409 |
| 4,609,788 | 9/1986 | Miller et al. .................... | 379/410 |
| 4,652,703 | 3/1987 | Lu et al. .......................... | 379/339 |
| 4,979,163 | 12/1990 | Erving et al. .................... | 379/288 |
| 5,014,294 | 5/1991 | Kromenaker et al. ........... | 379/58 |
| 5,016,271 | 5/1991 | Ford ................................. | 379/410 |
| 5,075,687 | 12/1991 | Chen et al. ...................... | 341/110 |
| 5,212,685 | 5/1993 | Stilwell, Jr. et al. ............ | 370/296 |
| 5,255,316 | 10/1993 | Poirier et al. ................... | 379/389 |
| 5,381,475 | 1/1995 | Cavallo ............................ | 379/410 |
| 5,544,159 | 8/1996 | Ablay ............................... | 370/296 |
| 5,544,242 | 8/1996 | Robinson ......................... | 379/390 |
| 5,548,638 | 8/1996 | Yamaguchi et al. ............. | 379/202 |
| 5,771,440 | 6/1998 | Sukhu et al. .................... | 455/63 |

FOREIGN PATENT DOCUMENTS 2256351  2/1992  United Kingdom ............. H04B 3/20

*Primary Examiner*—Alpus H. Hsu

[57] ABSTRACT

A method of increasing the terminal coupling loss in a digital half-duplex handsfree terminal is provided. When the terminal receive channel is active an idle code which is effectively zero is transmitted by an idle code generator. When the terminal transmit channel is active a normal speech signal is transmitted. To determine which channel is active, a receive speech signal level is measured at the receive channel input, and a "virtual" transmit speech signal is computed from a signal in the transmit channel before the idle code generator.

14 Claims, 4 Drawing Sheets

SYSTEM AND METHOD FOR PROVIDING HIGH TERMINAL COUPLING LOSS IN A HANDSFREE TERMINAL

FIELD OF THE INVENTION

The invention relates to a system and method for providing high terminal coupling loss in a handsfree telephone terminal.

BACKGROUND OF THE INVENTION

Echo returned to a user of a telephone causes the user to hear his or her own voice when speaking on the telephone. In high delay connections, such as those found in satellite or digital cellular applications for example, this echo can make conversation very difficult. To avoid this, it is necessary to ensure that digital telephone terminals provide a significant amount of inherent echo suppression. The amount of echo suppression in decibels that a telephone set provides is referred to as the "terminal coupling loss", or TCL.

As an example, GSM 03.50, an existing specification for digital cellular systems requires a minimum TCL of 46 dB to eliminate the effects of echo. Typically, handset terminals meet this requirement. However, because of the higher electronic gain needed to obtain comfortable listening levels, conventional handsfree terminals fall well short of this requirement. For two-wire analog handsfree terminals, this is normally not a problem because the PSTN (public switched telephone network) provides echo-suppression for long-delay connections. However, in all digital networks, echo suppression is not provided, and hence the task of providing the 46 dB of TCL falls to the telephone terminal itself. The problem is more severe in handsfree digital terminals verses handset terminals because a more significant acoustic echo path exists between the speaker and microphone. In addition, delays are larger in all digital networks and particularly in digital wireless networks. Four-wire analog terminals may also fail to provide sufficient TCL.

SUMMARY OF THE INVENTION

It is an object of the invention to provide a handstree terminal with improved terminal coupling loss performance.

According to a first broad aspect, the invention provides in a telephone terminal having a receive channel and a transmit channel only one of which is an active channel while in half-duplex handsfree mode, a method of increasing terminal coupling loss while in half-duplex handsfree mode comprising the steps of substituting a zero signal for a normal transmit speech signal when the receive channel is active, and transmitting the normal transmit speech signal when the transmit channel is active.

According to a second broad aspect, the invention provides in a telephone terminal having a receive channel and a transmit channel only one of which is an active channel while in half-duplex handsfree mode, a method of increasing terminal coupling loss while in half-duplex handsfree mode comprising the steps of substituting a zero signal for a normal receive speech signal when the transmit channel is active, and receiving the normal receive speech signal when the receive channel is active.

According to a third broad aspect, the invention provides a telephone terminal having a half-duplex handsfree mode comprising: a receive channel having an input line; an input speech level detector for making a receive speech level measurement on the input line; a transmit channel having an output line; a first zero signal generator connected between the output line and the remainder of the transmit channel; an interim speech level detector means for determining an interim signal level at some point in the transmit channel before the idle code generator; output speech level computation means for computing a virtual output speech level as a function of the interim signal level so that the virtual output speech level is what would effectively be measured at the output of the transmit channel in the absence of the idle code generator; switching means for selecting either the receive channel or the transmit channel as an active channel; and for controlling the first zero signal generator to transmit a zero signal when the receive path is active.

According to a fourth broad aspect, the invention provides a handsfree digital half-duplex digital telephone terminal comprising: a receive channel comprising an input line, a receive variolosser, a digital-to-analog converter, a receive amplifier, and a speaker connected together in sequence; a transmit channel comprising a microphone, a transmit amplifier, an analog-to-digital converter, a transmit variolosser, an idle code generator and an output line connected together in sequence; a first speech detector for making a receive speech level measurement at the input line; a second speech detector for making an interim speech level measurement on the transmit channel on a signal between the analog-to-digital converter and the transmit variolosser; voice switching processing means for determining a virtual transmit speech level on an output from the transmit channel by subtracting the transmit variolosser loss from the interim speech level measurement; for comparing the receive speech level with the virtual transmit speech level to determine either the receive channel or the transmit channel as an active channel; and for controlling the idle code generator to transmit an idle code when the receive channel is the active channel and to pass a transmit speech signal when the transmit channel is the active channel.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
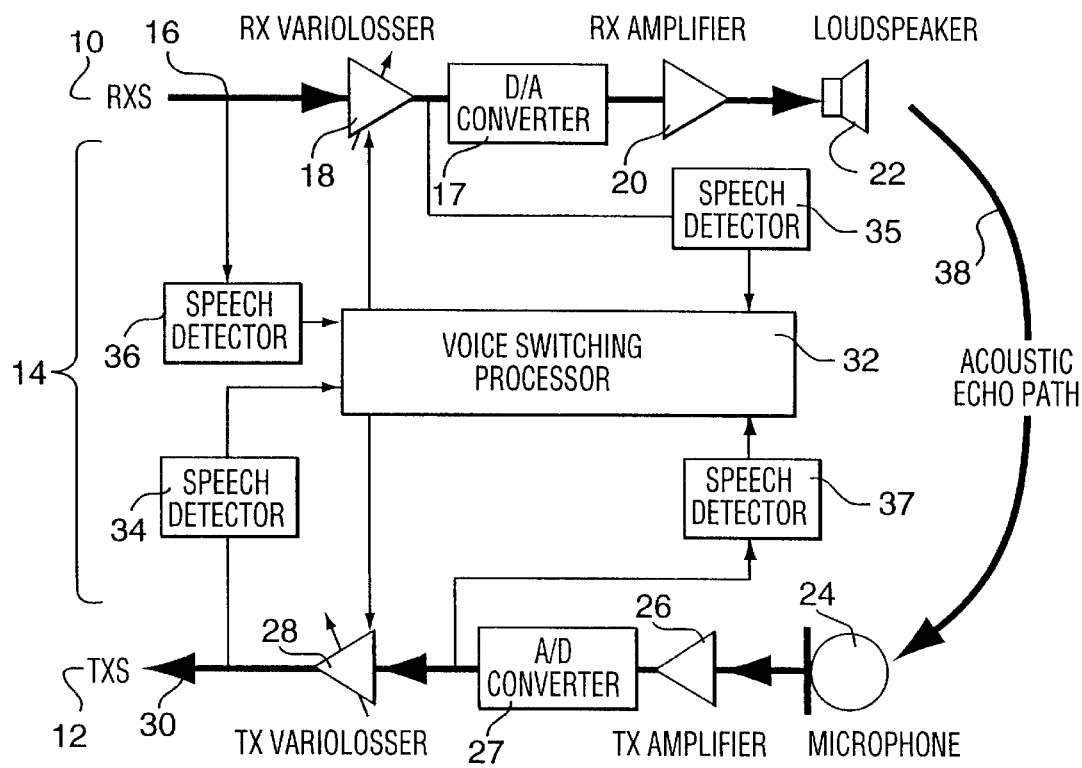
FIG. 1 is a block diagram of a conventional digital half-duplex handsfree terminal showing the terminal coupling path.

The structure and operation of a conventional digital half-duplex handsfree terminal will be described with reference to FIG. 1. The terminal has a receive channel 10, a transmit channel 12, and voice switching circuitry 14. Connected together in sequence, the receive channel 10 consists of a two-wire input line 16, an Rx (receive) variolosser 18, a D/A (digital-to-analog) converter 17, an Rx Amplifier 20, and a handsfree loudspeaker 22. Similarly, the transmit channel 12 consists of a handsfree microphone 24, a Tx (transmit) amplifier 26, an A/D (analog-to-digital) converter 27, a Tx variolosser 28, and a two-wire output line 30 connected together in sequence. The voice switching circuitry 14 consists of a voice switching processor 32, and four speech detectors 34, 35, 36, 37. The speech detector 36 measures the instantaneous speech level on the input line 16. The speech detector 34 measures the instantaneous speech level on the output line 30. The speech detector 37 measures the signal-to-noise ratio at the microphone. The speech detector 35 is usually not used. When present it measures the signal-to-noise ratio after the Rx variolosser 18. The four speech detectors 34, 35, 36, 37 pass their respective instantaneous speech level measurements to the voice switching processor 32.

The Rx and Tx variolossers 18, 28 are complementary programmable loss amplifiers with their loss set by the voice switching processor 32.

The Rx and Tx amplifiers 20, 26 are high electronic gain amplifier stages which provide comfortable listening and talking levels when users are at a distance of 50 cm from the handsfree terminal.

In a half-duplex terminal, only one channel is active at one time, i.e. if the transmit channel is ON, then the receive channel is OFF and vice versa. The variolossers 18, 28 are used to insert loss in the paths to turn them ON or OFF. More specifically, the voice switching processor 32 continuously monitors the speech detector levels and selects as the active channel the channel having the larger speech level. If the receive channel 10 is active, then the Rx variolosser 18 is set to a minimum loss, and the Tx variolosser 28 is set to a large loss, typically about -40 dB. The zero loss may be referred to as the "ON loss" and the large loss may be referred to as the "OFF loss". Similarly, if the transmit channel is the active channel 12, then the Tx variolosser 28 is set to the ON loss, and the Rx variolosser 18 is set to the OFF loss. When a switch in the active channel from one channel to another occurs, the variolosser loss of the previously inactive channel is decreased from the OFF loss until it is equal to the ON loss, while at the same time, the variolosser loss of the previously active channel is increased from the ON loss to the OFF loss. This switch in the active channel from one channel to the other is controlled by the voice switching processor 32, and is done over a finite period of time typically in the range of 10's of milliseconds so as to avoid audible clicks being produced.

An acoustic echo path 38 connects the speaker 22 to microphone 24. The acoustic echo path 38 is the path by which sound waves from the speaker 22 travel so as to be received by the microphone 24.

When a signal is received having a receive level RXS, there is a transmitted echo signal having a level TXS which is due to the received signal being coupled from the speaker 22 into the microphone 24 via the acoustic echo path 38. The total loss from the input line 16 to the output line 30 is referred to as the terminal coupling loss, or TCL and this is used to quantify the amount of echo suppression provided by the terminal. As indicated previously, 46 dB has been specified as an acceptable TCL. In practical handsfree terminal designs, it is not possible to provide enough acoustic path loss to meet the TCL requirement. It is possible to reduce the acoustic echo by using acoustic echo cancellation. However, practical acoustic echo-cancellers still do not provide enough cancellation to meet the 46 dB TCL requirement.

Figure 2:
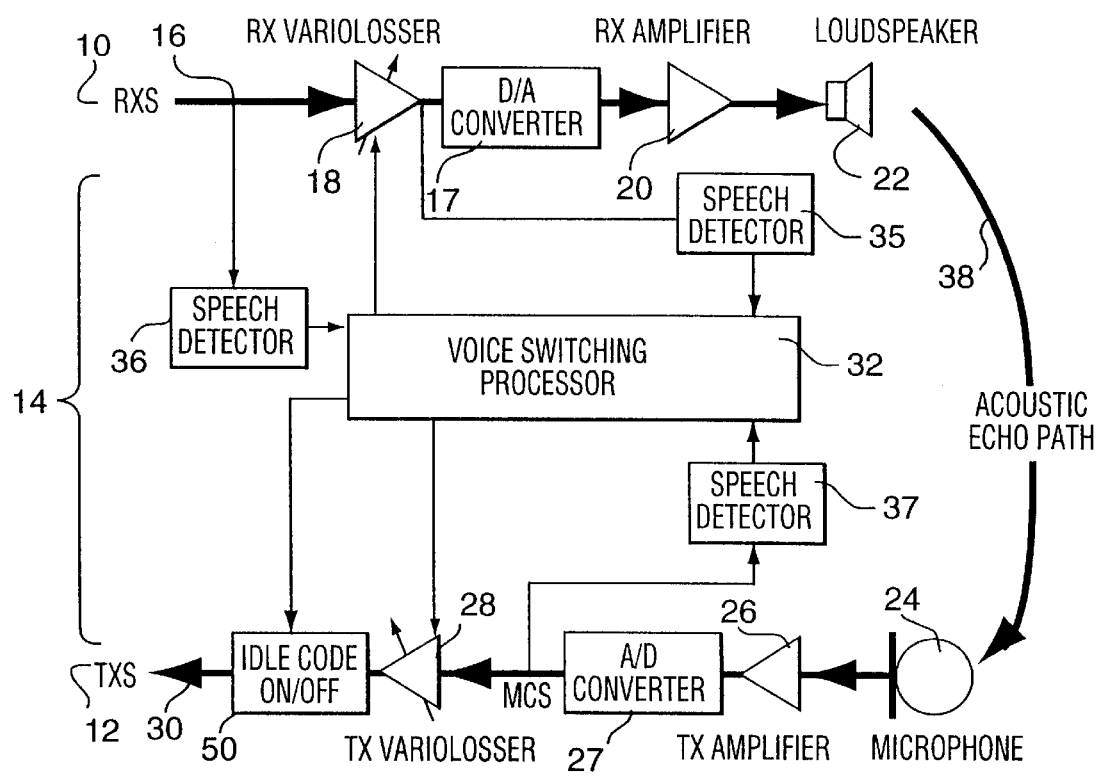
FIG. 2 is a block diagram of a digital half-duplex handsfree terminal according to an aspect of the invention showing the terminal coupling path.

Referring now to FIG. 2, which is a block diagram of a handsfree terminal according to the invention, components which are shared with the conventional terminal of FIG. 1 are similarly labelled. There are no changes in the receive channel 10. As in the prior art system, the speech detector 35 is not usually required. In the transmit channel 12, an idle code generator 50 is connected between the Tx variolosser 28 and the output line 30. The speech detector 34 which was present in the prior art system of FIG. 1 is not required. The function of speech detector 34 is replaced by a virtual calculation as detailed below.

In use, the received speech level is monitored as before through the speech detector 36. The transmit speech level is computed by the voice switching processor 32 from the speech level detected by the speech detector 37. The transmit speech level is computed by subtracting the Tx variolosser 28 setting from the microphone signal (MCS) level measured between the A/D converter 27 and the Tx variolosser 28 by speech detector 37. This is a "virtual" output speech level which would be transmitted on the output line 30 in the absence of the idle code generator 50. On the basis of these two speech levels, the active channel is selected as before, namely by selecting the channel with the larger speech level. When a switch between channels is to occur, the voice switching processor controls the Rx and Tx variolossers 18, 28 as before so as to increase the loss of the previously active channel while simultaneously decreasing the loss of the previously inactive channel. In addition, when a switch from the transmit channel to the receive channel occurs, after the Tx variolosser 28 setting has ramped down to its OFF setting, the voice switching processor instructs the idle code generator 50 to start transmitting on the output line 30 an idle code which is indicative of a speech level of zero. This is transmitted in place of the signal output by the Tx variolosser 28. The effect of this is to achieve an infinite TCL since there is no echo signal whatsoever on the output line when the active channel is the receive channel. When a switch from the receive channel to the transmit channel occurs, as soon as the voice switching processor 32 determines that it is time to switch, and before the ramping of the variolossers 18, 28, the idle code generator 50 signal is switched off, and the signal at the output line 30 is the output of the Tx variolosser 28. The variolossers 18, 28 are then ramped up as before, with the receive variolosser 18 being set to its OFF value, and the Tx variolosser 28 being set to its ON value.

This provides infinite TCL in the terminal with the result that a user at the other end of the connection hears no echo. If the terminal at the other end has a similar arrangement, then both users will experience no echo whatsoever.

It is noted that the Tx and Rx variolossers 28, 18 operate on digital signals. Thus the ramping up of the Tx variolosser 28 loss, for example, amounts to setting the loss to a sequence of increasing loss values, the sequence beginning on the ON value and finishing on the OFF value. When the Tx loss value is equal to the OFF value the idle code generator 50 starts transmitting the idle code.

Numerous modifications and variations of the present invention are possible in light of the above teachings. It is therefore to be understood that within the scope of the appended claims, the invention may be practised otherwise than as specifically described herein.

While in the illustrated embodiment the transmit speech level is computed as a function of a measurement taken between the A/D converter and the Tx variolosser, this is not essential. A measurement may be taken anywhere in the transmit channel before the idle code generator so long as the proper computation is performed by the voice switching processor to determine what the corresponding output signal would be. This would involve connecting the speech detector 37 at a different point in the transmit channel. Of course, the measurement cannot be taken after the idle code generator, because if the receive channel is active, this would always result in an output speech level of zero, and a switch to the transmit channel would never occur.

In the illustrated embodiment, a separate block consisting of an idle code generator 50 is used to insert infinite loss on the transmit path when the terminal is in a receive mode. Alternatively, the Tx variolosser may be equipped to transmit an idle code when the loss command received from the voice switching processor is below a certain value thereby eliminating the need for a separate idle code generator block.

Figure 3:
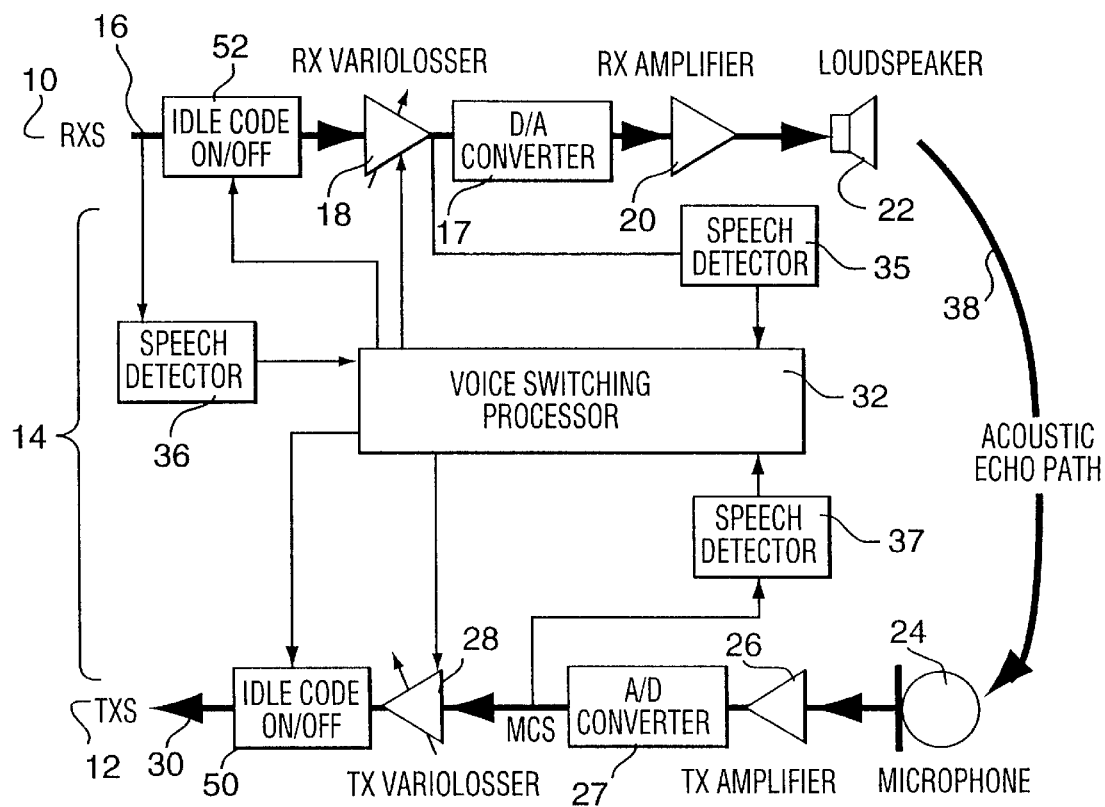
FIG. 3 is a block diagram of a digital half-duplex hands free terminal according to another aspect of the invention.

The invention has been described with reference to an embodiment in which an idle code generator is employed in the transmit channel to result in dramatically increased TCL. Assuming the terminal at the other end is similarly equipped, an acceptably high TCL will exist during both receive and transmit. If the terminal at the other end is not similarly equipped, then a larger echo will result while that terminal is receiving. Referring to FIG. 3, to combat this an idle code generator 52 may be used in the receive channel 10 between the input line 16 and the Rx variolosser 18. The speech detector 36 in the receive channel still makes its measurement before the idle code generator 52 so as to get an accurate reading of the receive speech signal strength. The idle code generator 52 in the receive channel 10 is then controlled so as to output an idle code, or zero signal while the Rx variolosser is at its OFF value, and to pass the normal received signal otherwise. When the idle code is being "received", the TCL is infinite.

Figure 4:
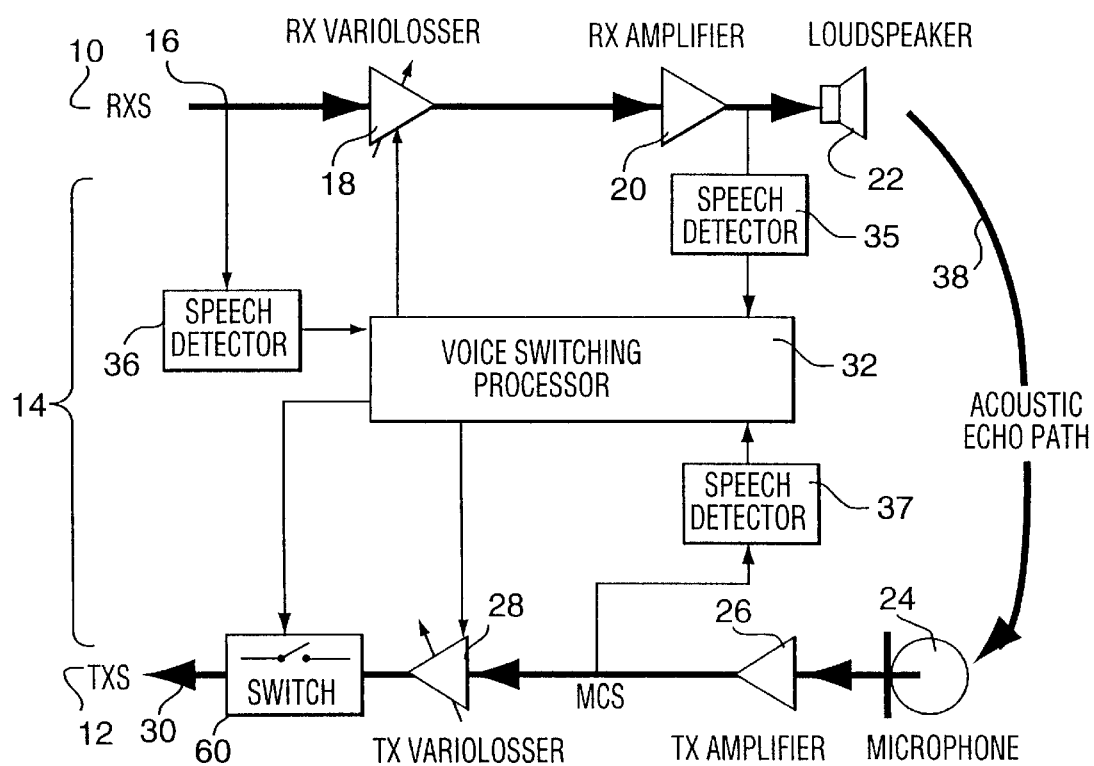
FIG. 4 is a block diagram of a four-wire analog half-duplex handsfree terminal according to another aspect of the invention.

While the invention has been described with reference to a digital half-duplex handsfree terminal, it is also applicable in modified form to an analog terminal, particularly a four-wire terminal. An example of this is shown in FIG. 4, which is similar to FIG. 2 except there are no A/D and D/A converters, and there is a switch 60 in place of the idle code generator 50 of FIG. 2. As in the digital embodiment, the input line 16 and the output line 30 are each two-wire lines. When the Tx variolosser reaches its OFF setting the voice switching processor 32 opens the switch 60 thereby opening the transmit path. The voice switching processor 32 closes the switch 60 thereby closing the transmit path when the Tx variolosser is set to any value other than its OFF value.

In the embodiment described, a handsfree terminal has been employed. The invention can also be applied to a half-duplex terminal which is not a handsfree terminal, or which is not in handsfree mode. In this case, the microphone and loudspeaker are located in the handset of the terminal. It is noted that the echo problem is less acute in non-handsfree terminals.

In practice, typically a handsfree terminal will have a non-handsfree mode during which full-duplex signalling is used. During full-duplex non-handsfree mode, the TCL improving methods provided by the invention are not used.

The embodiments of the invention in which an exclusive property or privilege is claimed are defined as follows:

1. In a digital telephone terminal having a receive channel and a transmit channel only one of which is an active channel while in half-duplex handsfree mode, a method of increasing terminal coupling loss while in half-duplex handsfree mode comprising:

making a receive speech level measurement on an input to the receive channel;

computing a virtual transmit speech level value on the basis of a speech level measurement taken on the transmit channel from a position located before where an idle code is substituted for the normal transmit speech signal;

comparing the receive speech level measurement with the virtual transmit speech level value to determine the active channel;

substituting the idle code for a normal transmit speech signal when the receive channel is active, and transmitting the normal transmit speech signal when the transmit channel is active.

2. A method according to claim 1 further comprising, when the active channel is to be changed, the steps of:

ramping down a variolosser loss for the previously inactive channel to an ON value;

ramping up a variolosser loss for the previously active channel to an OFF value; and substituting said idle code when the variolosser loss of the transmit channel is equal to its OFF value.

3. A method according to claim 2 wherein the steps of ramping up or down a variolosser loss from a first value to a second value comprise setting the variolosser loss to a sequence of values beginning at the first value and ending at the last value.

4. A method according to claim 1 further comprising the steps of substituting a received signal with a zero signal when the transmit channel is active, and receiving a normal received signal when the received channel is active.

5. In a digital telephone terminal having a receive channel and a transmit channel only one of which is an active channel while in half-duplex handsfree mode, a method of increasing terminal coupling loss while in half-duplex handsfree mode comprising:

making a receive speech level measurement on an input to the receive channel from a position before where an idle code is substituted for the normal receive signal;

making a transmit speech level measurement on an output of the transmit channel;

comparing the receive speech level measurement with the transmit speech level measurement to determine the active channel;

substituting the idle code for a normal receive speech signal when the transmit channel is active, and receiving the normal receive speech signal when the receive channel is active.

6. A method according to claim 5 further comprising, when the active channel is to be changed, the steps of:

ramping down a variolosser loss for the previously inactive channel to an ON value;

ramping up a variolosser loss for the previously active channel to an OFF value; and substituting said idle code when the variolosser loss of the receive channel is equal to its OFF value.

7. A method according to claim 6 wherein the steps of ramping up or down a variolosser loss from a first value to a second value comprise setting the variolosser loss to a sequence of values beginning at the first value and ending at the last value.

8. A telephone terminal having a half-duplex handsfree mode comprising:

a receive channel having an input line;

an input speech level detector for making a receive speech level measurement on the input line;

a transmit channel having an output line;

a first zero signal generator connected between the output line and the remainder of the transmit channel;

an interim speech level detector means for determining an interim signal level at some point in the transmit channel before the first zero signal generator;

output speech level computation means for computing a virtual output speech level as a function of the interim signal level so that the virtual output speech level is what would effectively be measured at the output of the transmit channel in the absence of the first zero signal generator;

switching means for selecting either the receive channel or the transmit channel as an active channel and for controlling the first zero signal generator to transmit a first zero signal when the receive path is active.

9. A terminal according to claim 8 wherein the terminal is an anolog terminal, and wherein said first zero signal generator is a switch.

10. A terminal according to claim 8 wherein the terminal is a digital terminal, the first zero signal generator is an idle code generator, and the first zero signal is an idle code.

11. A terminal according to claim 10 wherein each channel has a variolosser loss which is settable under control of the switching means, and when a switch from one channel to another occurs, the variolosser loss for the previously active channel is ramped down towards an OFF value, and the variolosser loss for the previously inactive channel is simultaneously ramped up towards an ON value, and wherein the idle code is transmitted while the variolosser loss for the transmit channel is set to its OFF value.

12. A terminal according to claim 8 further comprising a second zero signal generator forming part of the receive channel at a point after where the receive signal strength measurement is taken;

wherein said switching means also controls the second zero signal generator to generate a second zero signal when the transmit path is active thereby causing the second zero signal to be received.

13. A handsfree digital half-duplex digital telephone terminal comprising:

a receive channel comprising an input line, a receive variolosser, a digital-to-analog converter, a receive amplifier, and a speaker connected together in sequence;

a transmit channel comprising a microphone, a transmit amplifier, an analog-to-digital converter, a transmit variolosser, an idle code generator and an output line connected together in sequence;

a first speech detector for making a receive speech level measurement at the input line;

a second speech detector for making an interim speech level measurement on the transmit channel on a signal between the analog-to-digital converter and the transmit variolosser;

voice switching processing means for determining a virtual transmit speech level on an output from the transmit channel by subtracting the transmit variolosser loss from the interim speech level measurement; for comparing the receive speech level with the virtual transmit speech level to determine either the receive channel or the transmit channel as an active channel; and for controlling the idle code generator to transmit an idle code when the receive channel is the active channel and to pass a transmit speech signal when the transmit channel is the active channel.

14. A terminal according to claim 13 wherein when a switch from one channel to another occurs, the variolosser loss for the previously active channel is ramped down towards an OFF value, and the variolosser loss for the previously inactive channel is simultaneously ramped up towards an ON value, and wherein the idle code is transmitted while the variolosser loss for the transmit channel is set to its OFF value.

* * * * *